United States Patent
Dutt et al.

(10) Patent No.: US 10,928,086 B2
(45) Date of Patent: Feb. 23, 2021

(54) AUTO-ADDRESSING FOR A MULTI-DEVICE REFRIGERATION SYSTEM

(71) Applicant: Lennox Industries Inc., Richardson, TX (US)

(72) Inventors: Richard Dutt, Grand Prairie, TX (US); Christopher S. Tracy, Frisco, TX (US)

(73) Assignee: Lennox Industries Inc., Richardson, TX (US)

( * ) Notice: Subject to any disclaimer, the term of this patent is extended or adjusted under 35 U.S.C. 154(b) by 314 days.

(21) Appl. No.: 15/872,442

(22) Filed: Jan. 16, 2018

(65) Prior Publication Data

US 2019/0219294 A1 Jul. 18, 2019

(51) Int. Cl.
| | | |
|---|---|---|
| *F24F 11/54* | (2018.01) | |
| *F24F 11/49* | (2018.01) | |
| *F24F 11/58* | (2018.01) | |
| *F24F 11/64* | (2018.01) | |
| *G05B 19/042* | (2006.01) | |
| *F24F 11/61* | (2018.01) | |

(52) U.S. Cl.
CPC ............. *F24F 11/54* (2018.01); *F24F 11/49* (2018.01); *F24F 11/58* (2018.01); *F24F 11/61* (2018.01); *F24F 11/64* (2018.01); *G05B 19/042* (2013.01); *G05B 2219/2614* (2013.01)

(58) Field of Classification Search
CPC .................. F24F 11/54; G05B 2219/2231
See application file for complete search history.

(56) References Cited

U.S. PATENT DOCUMENTS

| | | | | |
|---|---|---|---|---|
| 2014/0369362 | A1* | 12/2014 | Chessher | H04B 7/2656 370/449 |
| 2015/0027156 | A1* | 1/2015 | Bellamy, Jr. | F24F 5/0035 62/259.4 |
| 2015/0227482 | A1* | 8/2015 | Winter | G06F 13/4234 710/117 |
| 2016/0173441 | A1* | 6/2016 | Lee | H04L 61/2092 709/220 |
| 2017/0294092 | A1* | 10/2017 | Farley | H04L 61/2038 |

\* cited by examiner

*Primary Examiner* — William G Trost, IV
*Assistant Examiner* — Christopher P Cadorna
(74) *Attorney, Agent, or Firm* — Baker Botts L.L.P.

(57) ABSTRACT

According to certain embodiments, a system comprises a master device and a plurality of slave devices. The master device configured to determine that one or more of the slave devices use a default address reserved for unconfigured devices, and to communicate a command to each slave device that is using the default address. The command comprises a list of unused addresses and an instruction to enter a selection round to select one of the addresses from the list.

17 Claims, 4 Drawing Sheets

AUTO-ADDRESSING FOR A MULTI-DEVICE REFRIGERATION SYSTEM

TECHNICAL FIELD

Certain embodiments of the present disclosure relate generally to automatic assignment of device addresses for configuration of networked refrigeration systems.

BACKGROUND

Commercial refrigeration systems may implement multiple linked devices to provide coverage for larger areas and allow for more added control of refrigeration conditions between zones. These more complex systems require distributed controllers that are networked together in order to provide overall system control. To operate over such a network, each device on the bus network must have a unique address to facilitate proper communication. Manual configuration of each device address can be difficult and time-intensive, especially with many controllers in unknown or physically inaccessible locations.

SUMMARY OF THE DISCLOSURE

According to certain embodiments, a system comprises a master device and a plurality of slave devices. The master device is configured to determine that one or more of the slave devices use a default address reserved for unconfigured devices and communicate a command to each slave device that is using the default address. The command comprises a list of unused addresses and an instruction to enter a selection round to select one of the addresses from the list.

In some embodiments, the command further comprises a time window for the slave devices to perform the selection round. Each slave device that is using the default address is configured to determine a time slice within the time window to select one of the addresses from the list of unused addresses. For example, in some embodiments, each slave is configured to determine the time slice at random based at least in part on a serial number associated with that slave device. During its respective time slice, each slave selects one of the addresses from the list of unused addresses and communicates a message indicating the selected address to the master device and the other slave devices. The message allows the other slave devices to remove that address from the list of unused addresses so that the other slave devices select different addresses.

In some embodiments, the master device is further configured to determine that a first slave device and a second slave device selected the same address from the list of unused addresses. In response, the master device is configured to communicate a second command to the first slave device and the second slave device. The second command comprises a list of remaining unused addresses and an instruction to enter a second selection round to select one of the addresses from the list of remaining unused addresses.

In some embodiments, the master device is further configured to detect an error based on a first slave device and a second slave device using overlapping time slices to select their respective addresses and/or to indicate their selected addresses to the master device and the other slave devices. In response, the master device is configured to communicate a second command to the first slave device and the second slave device. The second command comprises a list of remaining unused addresses and an instruction to enter a second selection round to select one of the addresses from the list of remaining unused addresses.

In some embodiments, a first slave device is further configured to select a first address from the list of unused addresses during the selection round, operate using the first address for a period of time; and reset the first address to the default address as a result of the first slave device becoming unreliable.

In some embodiments, each slave device that is using the default address is configured to randomly select one of the addresses from the list of unused addresses.

In some embodiments, the system comprises an HVAC system and the master and slave devices each comprise a heat exchanger and a controller. The controller communicatively couples to the system operable via an interface using MODBUS protocol.

In some embodiments, the master device is further configured to communicate one or more HVAC-related parameters to one of the slave devices using the address selected by that slave device. The slave device to which the HVAC-related parameters are addressed is further configured to use the HVAC-related parameters to perform an HVAC-related operation.

According to certain embodiments, addresses may be automatically assigned to devices on a bus network by pre-assigning a particular address to new devices added to the network that will be recognized by a device selected to act as the master device. In certain applications, the master device will command each unconfigured device to select an available address and reply to the master device with the selected address during a time slice of a configuration round. In certain applications, the master device will catch a potential communication collision when two devices select the same address and the master device will command the devices with conflicting addresses into a subsequent selection round. In certain applications, the master device will continuously monitor the networked addresses to detect the addition of a new device and the master device will command the new device to enter an address selection round.

According to certain embodiments, a system is configured for use in refrigeration control network. The system comprises a plurality of devices that each possess a controller and a heat exchanger. A user may select any of the devices to designate as the master device and the remaining devices will become slave devices. The master and slave communication relationship between the devices refers to the uni-directional control from the selected master device to the plurality of slave devices. In certain embodiments, it may be possible for a user to reconfigure the system of devices by designating a new master device out of the plurality of networked devices. In these embodiments, a user may select an original master device and later select a new device or a formerly slave device to act as the new master device. In such an embodiment, each of the other plurality of devices would reorient themselves as slave devices and would operate to recognize the new master device according to its now established status as the master device. In such an embodiment, the former master device would either be removed from the network or would relegate itself to the rank of slave device.

According to certain embodiments, the plurality of devices are communicatively coupled to a network. For example, the network may be created by coupling the plurality of devices using serial lines between devices. The devices on the network may use a communication protocol to facilitate proper communication between the master device and the slave device. The communication protocol on the network may follow the Modbus standard. The communication protocol may also be related to the Modbus standard but depart in certain aspect by violating the standard and allowing slave devices to initiate certain communication. After completing address selection, each device on the network may have a unique address to facilitate communication from the master device to an individual slave device.

According to certain embodiments, a single address in the range of available addresses may be reserved as a default address. The default reserved address may serve to indicate that a device has not been configured and needs to be assigned a unique address. The default reserved address may also serve to indicate that the device has become unreliable and needs to be reconfigured. The reserved number may be communicated from the slave devices to the master device in response to a request from the master device to the slave devices requesting that each slave device report its address. Alternatively, the master device may monitor the system and detect that one or more unconfigured devices are present on the system.

According to certain embodiments, when there are unconfigured devices on the system that correspond to the default reserved address, the master device will command each of the slave devices with the reserved default address to enter a selection round. In the selection round each unconfigured slave device will pick an address from a list of unassigned addressed provided by the master device. The unconfigured slave devices that have entered the selection round will each calculate a time slice within the fixed time window of the selection round in which the unconfigured slave device will make its address selection from the list of unassigned addresses provided by the master device. During the time slice calculated by the slave device the slave device will make its address selection and then communicate the address selection to the master device. The address selection will also be communicated to all other devices so that the selected address may be eliminated from the list of unassigned addresses to prevent another slave device from later selecting the same address.

According to certain embodiments, if two or more unconfigured slave devices select overlapping time slices within the fixed time window of the selection round the master device will catch the communication collision and command those conflicting slave devices to enter a subsequent selection round and to reselect from a list of unassigned addresses provided by the master device. According to certain embodiments, if two or more unconfigured slave devices select the same address, the master device will catch the duplicate address assignment and the master device will command those conflicting slave devices to enter a subsequent selection round and to reselect from a list of unassigned addresses provided by the master.

Certain embodiments may provide one or more technical advantages. As an example, certain embodiments provide advantages over manual configuration of device addresses on a network. Such a system will save time and physical toll from moving between devices in order to manually assign each address to each device on a network. As another example, certain embodiments provide the advantage of improved reliability because the system may recognize when a device is becoming unreliable and may remedy the unreliability by resetting the unreliable device's address to the default unconfigured address, causing the master device to detect the unreliable device as an unconfigured device and reconfigure the device. As another example, certain embodiments will also have the advantage of making it easier to add new devices to an existing system because the newly added device would present the default unconfigured address to the network, and the master device would initiate configuration of the newly added device based on detecting the default unconfigured address.

Certain embodiments have advantages even when implemented with manual configuration of a Modbus system. For example, even during a manual configuration of devices in Modbus, the master device can continuously monitor the starting address for the presence of devices. When the last device has been manually configured, there will be no more devices responding to the starting address. This may allow the master device to monitor the system for all devices configured without asking the user to identify the last device to enter the total number of devices, thus eliminating two possible sources of error during manual configuration.

Certain embodiments may include all, some, or none of the above-described advantages. Other advantages will be apparent to those of ordinary skill in the art.

BRIEF DESCRIPTION OF THE DRAWINGS

For a more complete understanding of the present disclosure, reference is now made to the following description, taken in conjunction with the accompanying drawings, in which.

DETAILED DESCRIPTION

Embodiments of the present disclosure and its advantages are best understood by referring to FIGS. 1 through 4B of the drawings, like numerals being used for like and corresponding parts of the various drawings.

Refrigeration systems cool spaces based on HVAC-parameters set by a controller. These HVAC-parameters may be carried out by an associated heat exchanger which causes heat transfer between the heat exchanger itself and the surrounding ambient space. Larger refrigeration systems may utilize multiple refrigeration devices such as multiple heat exchangers in order to provide greater thermal influence over a space and also to provide more selective heat transfer between various spaces. For these larger refrigeration systems, each device may have its own controller to regulate the HVAC-parameters for that individual device. These multiple controllers may all be communicatively coupled via a network to allow for more complete control over the entire system rather than on a device-by-device basis. To provide appropriate communication between coupled devices, the devices may utilize a protocol on a network. For such protocols, each device must have a unique address so that HVAC parameters may be communicated to specific devices to distribute the desired overall refrigeration profile. Rather than manually assign each address to each device and provide the assigned addresses to the master devices, the networked devices may automatically determine a unique address for each slave device and communicate the selected address to the master device.

Figure 1:
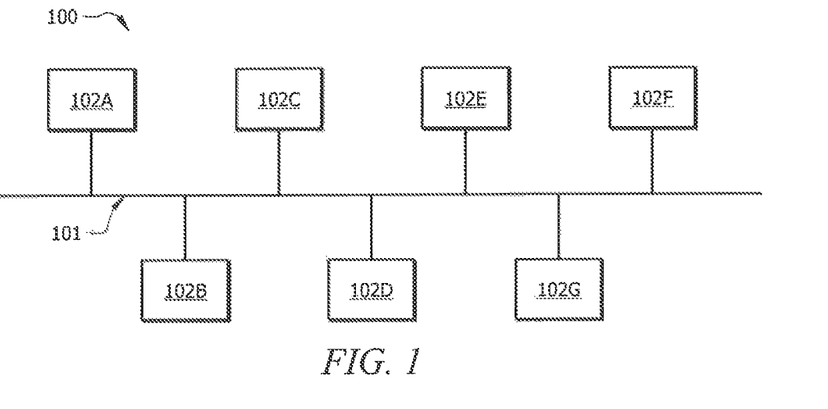
FIG. 1 illustrates an example system of networked devices.

FIG. 1 illustrates an example system including a plurality of devices communicatively coupled to a network. As illustrated in FIG. 1, a system 100 includes a network 101. The network 101 is communicatively coupled to a plurality of devices 102A-102F. It is understood that the plurality of devices 102 may include any number of devices 102. In certain embodiments, the number of slave devices 102 will range from 0-246. Devices 102 will be described in further detail in FIG. 2. The network 101 facilitates communication between devices 102. The particular network 101 depicted in FIG. 1 is a serial bus network, but it is understood that network 101 may be of any network type such as local area networks, wireless local area networks, and wide area networks, and may be of any type of arrangement such as point-to-point, linear or distributed bus, star, ring, mesh, daisy chain, or hybrid topology.

In some embodiments, the network 101 in FIG. 1 follows a Modbus protocol to allow the various devices 102A-102F to define the rules and conventions of communication amongst the devices coupled to network 101. The Modbus protocol allows for transmitting data over serial lines between devices 102. It is understood that network 101 may implement no protocol or may use any form of protocol such as TCP/IP, Secure Shell, File Transfer Protocol, Simple Mail Transfer Protocol, Transmission Control Protocol, Hyper Text Transfer Protocol, Media Transfer Protocol, Secure Socket Layer, Point to Point Protocol, or Internet Message Access Protocol.

In some embodiments, the Modbus protocol utilized in FIG. 1 dictates that there is one master device 102. A user may select any device 102 from system 100 to be designated the master device, the rest of the devices 102 will be the slaves. For example, a user may select device 102A to be the master device and then devices 102B-102F will act as slave devices. The master device 102A will function to control the operation of slave devices 102B-102F by communicating with the slave devices using network 101. A user may make a later selection of a master device after making an original master device selection. Continuing the previous example where a user may select device 102A as the master device, and the rest of the devices 102B-102F as slave devices, a user could later select one of the slave devices 102B-102F to operate as the master device. For example, if in making a later selection a user selected slave device 102B to act as the master device, the system would reconfigure itself to recognize what was formerly slave device 102B now as master device 102B, devices 102A and 102C-102F would then become the slave devices and treat device 102B as the master device. In another embodiment, a user may add a new device 102 to the system 100 and the user may choose to the new device 102 as the master device. The new device 102 added to system 100 would then become the master device and all of the other devices 102A-102F would become the slave devices. Alternatively, in some embodiments, it may be possible for a device 102 to self-select as the master based on one or more pre-configured rules.

Each slave device 102 in FIG. 1 will have an address that uniquely identifies each device and to facilitate communication through network 101. The addresses may be any number. The addresses may be a range of numbers. For example, the addresses may be an integer from 1-247. A unique address may be assigned to each slave device 102 to direct specific commands to each particular device 102. In particular embodiments, the slave devices would each have a unique slave address, while the master device would not be assigned a slave address.

In certain embodiments, newly added devices and devices in an unconfigured or an unreliable state will use a single known address. This single default address will be reserved to indicate to other devices 102 on the network 100 that the particular device with the reserved address is in an unconfigured state. In some embodiments, the number that is reserved to indicate an unconfigured device 102 could correspond to address number 247. In such an embodiment, any device 102 with address 247 would be recognized by the master device as an unconfigured device waiting to receive a unique assigned address.

In certain embodiments, when a system 100 is installed each device 102 on network 100 would be in an unconfigured state with each device 102 having address number 247. A user may then select one of the devices 102 to act as the master device. The master device would then command all of the other slave devices 102 to enter a selection round where they will each pick an address from a list of unused addresses, the command sent by the master device will be further detailed in FIG. 3. Each device will calculate a random time slice within a fixed time window to make its address selection. During the slave device's time slice the slave device selects its address and then notifies all other devices that the address it selected is no longer available, the calculation of a time slice and selection of an address by the slave devices will be further detailed in FIG. 4A-4B. The master device 102 may, from time to time, check system 100 for unconfigured devices 102 using address number 247. A configured device 102 that enters an unreliable state can be commanded by the master device 102, by the unreliable slave device 102, or by the system 100 to reset the address of the unreliable slave device to the reserved unconfigured address, this would allow the system to detect the slave device as an unconfigured device and command it to re-execute configuration (e.g., after selecting a new address).

According to a certain embodiment, a set of refrigeration devices and their associated controllers are in an unconfigured state with a default address indicating that they need to be configured and assigned a new address. A user may select any of the plurality of unconfigured devices to act as a master device, the rest to operate as slave devices. The master device may act the master device or be assigned a particular address indicating its status as the master device. The master device may then recognize the presence of slave devices on the network having the unconfigured default address. The master device may then communicate to each unconfigured slave device a list of available addresses and command each of the unconfigured slave devices to select an address from the list of available addresses. The master device may further communicate to the unconfigured slave devices a command to communicate the selected address of the slave device back to the master device within a selection round having a time window comprising a plurality of time slices.

In certain embodiments, there may be more than one reserved address. The different reserved addresses may indicate different statuses or conditions of the respective device 102.

Figure 2:
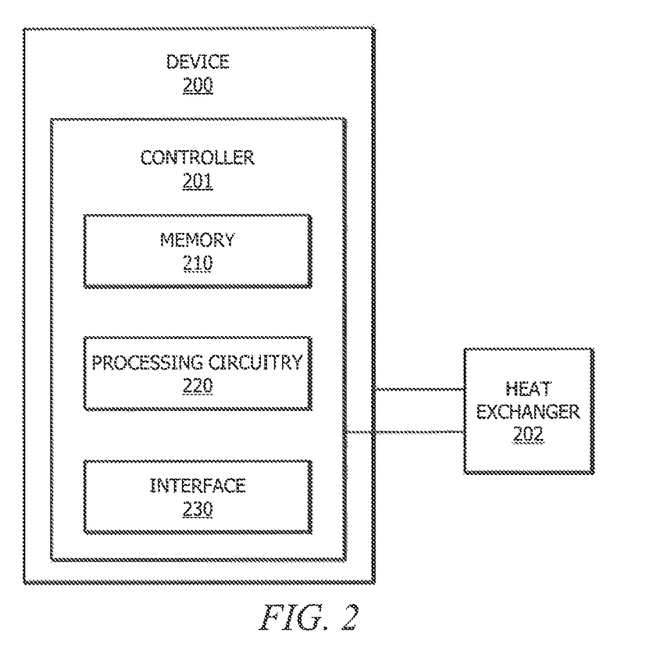
FIG. 2 illustrates an example device.

Referring now to FIG. 2, system 100 may include one or more devices 200 with controllers 201 that control operation of one, some, or all components within the system to meet a demand. In the illustrated embodiment of FIG. 2, controller 201 includes a memory 210, processing circuitry 220, and an interface 230. In an embodiment, controller 201 may comprise, or be coupled to, a computer-readable medium with memory 210 for storing control logic or instructions for operating HVAC system 100 components. Controller memory 210 may be a volatile or non-volatile memory of any known type commonly used in HVAC systems. Controller 201 may store computer executable instructions within memory 210. The computer executable instructions may be included in computer code. Controller 201 may be implemented with hardware, software, firmware, or any combination thereof.

Controller 201 may, additionally, be implemented with processing circuitry 220 for executing stored instructions. Controller 201 may be responsive to or operable to execute instructions stored as part of software, hardware, integrated circuits, firmware, micro-code or the like. The functions, acts, methods or tasks performed by controller 201, as described herein, may be performed by processing circuitry 220 executing instructions stored in memory 210. The instructions are for implementing the processes, techniques, methods, or acts described herein. Controller processing circuitry 220 may be any known type of processing circuitry commonly used in HVAC systems. The processing circuitry may be a single device or a combination of devices, such as associated with a network or distributed processing. Controller 201 may operably couple to HVAC system 100 components via wired or wireless connections.

Controller 201 may receive data, which may comprise signals from one or more remote sensing devices. The data received by controller 201 may be received directly from one or more remote sensing devices, or, may be received indirectly through one or more intermediate devices such as a signal converter, processing circuitry, an input/output interface (e.g. network 101), an amplifier, a conditioning circuit, a connector, and the like. Controller 201 may operate system 100 components in response to received data from remote sensing devices. Additionally, controller 201 may operate HVAC system 100 components in response to user input, demands of the conditioned space, refrigerant and/or ambient air conditions, control logic, and the like.

Device 200 may also include various HVAC components such as an evaporator coil, condensing unit, heat exchanger, refrigerant lines, blower fan, condenser fan, and/or a compressor. In certain embodiments, controller 201 of device 200 may be coupled to and control a heat exchanger 202 using certain HVAC-related parameters communicated to the controller 201 of device 200 through network 101 from a master device 102 of system 100. The heat exchanger 201 may be configured to cause heat transfer between the refrigerant in the heat exchanger and the medium. The heat exchanger 201 may be an air coil, shell and tube, plate, plate and shell, plate and fit, or any other type heat exchanger commonly used for heat transfer or HVAC systems.

Figure 3:
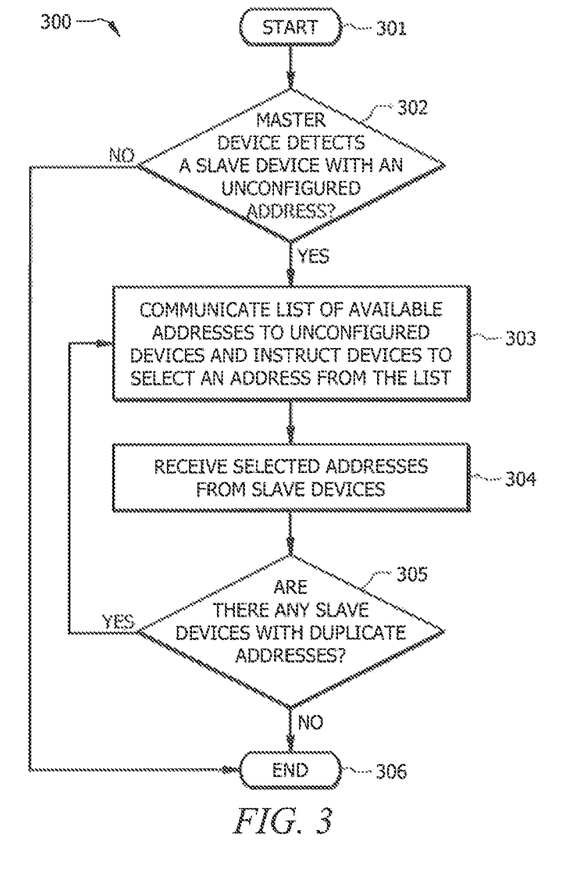
FIG. 3 is a flowchart illustrating a method that may be performed by an example master device.

FIG. 3 is a flowchart illustrating a method of operating example multi-device refrigeration systems. In particular embodiments, master device 102 performs method 300. In step 301, the device 102 operates as the master device if a user selects the device out of the available devices 102 on system 100. The method 300 may be started in step 301 by the selection of a user or the method 300 may be initiated by the device 102 itself from time-to-time to check the system to determine if there are any new devices 102 added to the network 101 or diagnose if any device 102 have become unreliable.

In particular embodiments, in step 302 the master device 102 may detect a slave device 102 that has a reserved unconfigured address. The master device may accomplish step 302 by detecting the slave devices by prompting the slave devices to communicate their addresses to the master device. The master device may prompt all slave devices to communicate their addresses to the master device or the master device may prompt only slave devices with an address corresponding to the reserved default unconfigured address to communicate their address to the master device. In another embodiment, the master device may accomplish step 302 by receiving an unprompted communication from a slave device identifying that the slave device has a reserved default unconfigured address. If there are no unconfigured addresses detected by the master device in step 302 the master device may terminate the method. If there is at least one slave device with a default reserved unconfigured address detected by the master device the master device will being to configure the slave devices 102 on the network 101.

In certain embodiments, the master device may begin configuration of slave devices in step 303 by communicating a list of available addresses to the detected unconfigured devices having the reserved default unconfigured address and instructing the unconfigured slave devices 102 to select an address from the list of available addresses. It is understood that step 303 may be accomplished by sending the list of available addresses and the instruction to select an address from the list of available addresses in a single communication or separated into multiple communications. In certain embodiments, the instructions to select an address in step 303 may also include instructions to respond with the selected address. The list of available addresses may be provided in any suitable format. For example, the list can arrange the addresses in consecutive order (e.g., 1, 2, 3, . . . N) or non-consecutive order (e.g., 15, 201, 31, 45, 213, etc.) The number of addresses on the available list may correlate one-to-one with the number of unconfigured slave devices, or number of addresses on the available list can be greater than the number of unconfigured slave devices. The list can be expressed as individual addresses (e.g., 1, 2, 3 . . . . N), an address range (e.g., 1-N), or a combination (e.g., 1-4, 8, 12, 15-N).

In certain embodiments, the instructions may specify a time window in which to respond with the selected address. A predetermined time window may be communicated to the slave devices to ensure that the master device will know when to listen for a response from the slave devices and may evaluate whether every device 102 in the system 100 has been accounted for with a unique address. For example, the master device may instruct the slave device that the time window has a duration of two seconds and to select a time slice within that two second window, the time window may also be provided to the slave device as a start time and an end time for the time window. In certain embodiments, the instructions may also include instructions for the unconfigured slave device 102 to select a time slice within the time window in which to respond to the master device with the selected address from the list of available addresses. In certain embodiments, the time slices within the time window may be predetermined segments of time that do not overlap that may be randomly selected by slave devices 102 or time slices may be of predetermined length and randomly selected by slave devices 102 from any time period within the time window.

In certain embodiments, in step 304 the master device will receive from the slave device the address selected by the slave device. The master device may use processing circuitry 220 to save the received address from the slave device to memory 210. The received address from the slave device may be saved to the memory 210 in a table. For example, the received address may be saved to the memory 210 along with other stored addresses from other slave devices, these addresses may be saved in a Modbus map.

In certain embodiments, the master device 102 will recognize any address conflicts in step 305. An address conflict can occur when two devices select time slices in the time window that overlap. This may cause interference in the communications from the slave devices to the master device.

An address conflict may also occur if two slave devices each select the same address during the selection round. In certain embodiments, if an address conflict has occurred, the master device may then recognize the potential address conflict amongst slave devices and resolve the address conflict by providing a new list of available addresses and ordering each device having a conflicting address through another address selection round. This may occur when the master device 102 recognizes that an address conflict has occurred and the master device will then reinitiate step 303 and will communicate a new list of available address to the devices to the conflicting devices. The master device may again specify a time window in which to respond with the selected address. In certain embodiments, as before, the instructions may also include instructions for the unconfigured slave device 102 to select a time slice within the time window in which to respond to the master device with the selected address from the list of available addresses. In some embodiments, the master device may reconfigure all of the unconfigured devices initially detected in step 302 or may only reconfigure the devices identified in step 305 as having conflicting duplicate addresses.

Figure 4A:
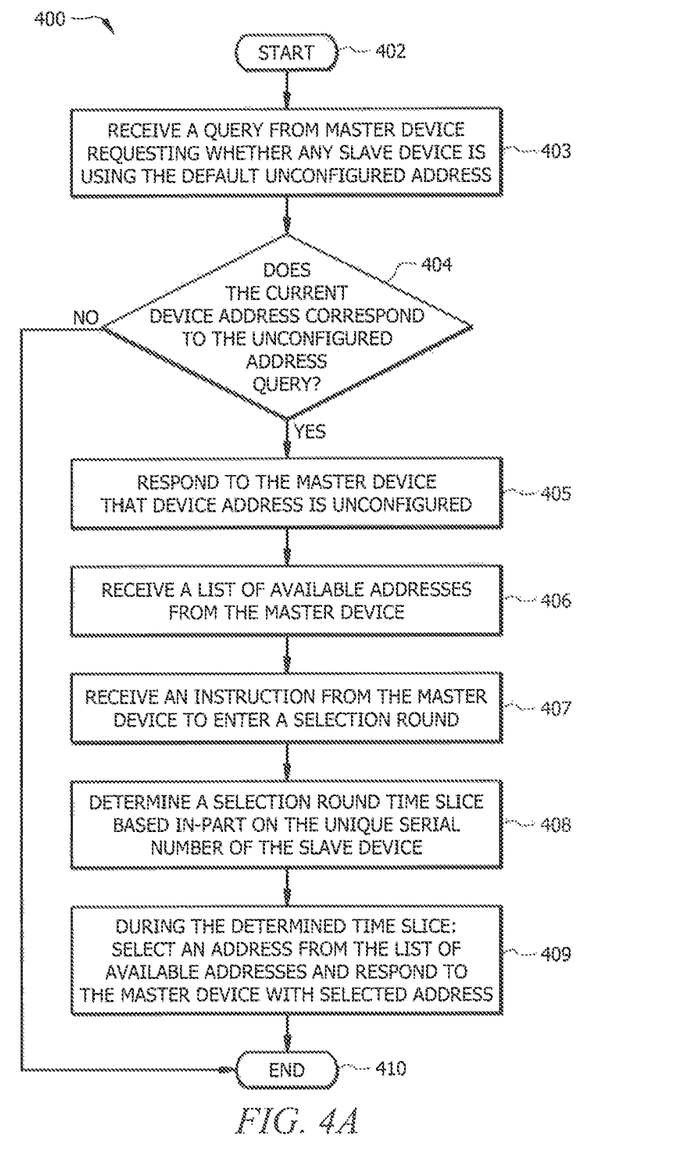
FIG. 4A-4B are flowcharts illustrating methods that may be performed by example slave devices.

In some embodiments, the master device is further configured to communicate one or more HVAC-related parameters to one of the slave devices using the address selected by that slave device. Examples of HVAC-related parameters may include setpoints (such as temperature or pressure setpoints), compressor speed, fan speed, or any other suitable parameters. FIG. 4A is a flowchart illustrating a method of operating example multi-device refrigeration systems from the perspective of a slave device. In particular embodiments, slave device 102 performs method 400. In step 402, the device 102 operates as a slave device in communication with a master device and other slave devices 102 in system 100. The method 400 may be commenced in step 402 by either a signal received from the master device 102 or the method 400 may be initiated by the slave device 102 itself. The slave device itself may initiate method 400 by beginning with step 402 after determining that the slave device itself is assigned with the default reserved address. The default reserved address used to indicate that a device 102 is unconfigured may be any number, for example, the default reserved address may be the address number 247. In some embodiments, a slave device having address 247 may begin method 400 by initiating step 402.

In certain embodiments, in step 403 slave device 102 may receive a query from the master device requesting whether the slave device is using the default reserved address. In some embodiments, the query may be a global query to all slave devices on network 101. In step 404, if the slave device 102 has an address which corresponds with the default reserved address for system 100, for example such as address 247, then the slave device 102 will proceed with method 400, otherwise if the slave device 102 has any address other than the default reserved address the slave device 102 will terminate method 400 and end with step 410.

In certain embodiments, a slave device 102 having an address which corresponds to the default reserved address will respond to the master device in step 405, providing the current address of the slave device 102 and indicating to the master device that the slave device 102 is in an unconfigured state. In certain embodiments, steps 406 and 407 comprise a command sent from the master device and received by the slave device 102. In certain embodiments, the command comprises a list of available addresses and instructions received by the slave device 102 in step 406. In some embodiments, the command comprises instructions received by the slave device 102 in step 407, instructing the slave device to enter a selection round. It is understood that the command could be received from a single communication or the command may be multiple messages received through network 201. In certain embodiments, the instructions to select an address in step 407 may also include instructions to respond with the selected address.

In certain embodiments, the instructions may specify a time window in which to respond with the selected address. In certain embodiments, the instructions may also include instructions for the unconfigured slave device 102 to select a time slice within the time window in which to respond to the master device with the selected address from the list of available addresses. For example, the command may be received as a communication containing a list of available addresses and a second communication may be received containing instructions directing slave device 102 to select a time slice in a time window and to select an address from the list of available addresses, the instructions may further include instructions to respond to the master device with the selected address during the selected time slice. It is also understood that the command including the list of available addresses and instructions may be further divided and sent over any number of communications.

In certain embodiments, in step 408 and 409 the slave device 102 would carry out the command received from the master device in steps 406 and 407. Steps 408 and 409 may be carried out together or may be performed separately. In step 408, the slave device 102 may determine its time slice during the time window of the selection round. The time slice determined in step 408 by slave device 102 may be determined based on the instructions received from the master device in step 407. The instructions received in step 407 may include the duration of the time window or the start time and end time of the time window of the selection round.

The instructions received in step 407 may further instruct the slave device 102 on how to select a time slice and how long a time slice should be. In certain embodiments, the time slices within the time window may be discrete or they may be randomly selected from anytime within the time window. The length of a time slice may be based on factors such as the number of total devices 102 on a system 100, the number of unconfigured devices on the system, the number of devices concurrently instructed to enter a selection round, the length of the time window, and/or any other factors relevant to the selection round.

In certain embodiments, the length of the time slice may be calculated to minimize the potential for conflicting time slices which could result in communication interference if multiple devices simultaneously communicate their selected address over network 101. For example, for a system 100 having six total devices, four of which unconfigured and commanded to enter the same selection round, the master device may instruct each of the slave devices commanded to enter the selection round to select a time slice with a length of one eighth of a second during a three second time window during the selection round. In certain embodiments, the processing circuitry 220 of device 102 may randomly select the time slice within the time window. The random selection may be accomplished by implementing a computation random number generator using processing circuitry 220 or a pseudorandom number generator. In some embodiments, the serial number associated with the device may be used as a seed value for the random number computation algorithm.

In certain embodiments, in step 409 the slave device will select an address from the list of available addresses provided by the master device in step 406 to be used as the slave device's address. For example, during the slave device's determined time slice the slave device may select the first available address from the list of available addresses and the subsequent slave devices may then sequentially select addresses from the list of available address during their respective determined time slices. As an example, suppose the list received from the master device listed the following sequence of unused addresses: 15, 201, 31, 45, 213. The slave device with the earliest time slice would select address 15, the slave device with the next earliest time slice would select address 201, and so on. The slave device 102 may store its selected device address in the device's own memory 210 using processing circuitry 220. The slave device may communicate the selected address to the master device by responding to the master device with the selected address, the master device may store the slave device's address in memory 210 to facilitate communication over network 101 with the slave device 102.

It is understood that in certain embodiments the slave device may instead select an address at random. For example, the slave may select its address randomly (rather than sequentially) from the list of unused/available addresses provided by the master device in step 406. Alternatively, in some embodiments, rather than configuring the master device to provide the list of unused/available addresses in step 406, the slave device may be pre-configured to perform random address selection from a predetermined pool of addresses (e.g., the pool may comprise any address in the range of addresses included on network 101 except for any reserved addresses, such as an address reserved to indicate an unconfigured device 102). The random selection may be accomplished by implementing a computation random number generator using processing circuitry 220 or a pseudorandom number generator. In some embodiments, the serial number associated with the device may be used as a seed value for the random number computation algorithm.

In certain embodiments, the selected address is also sent to the other slave devices 102. This communication including the selection of the address may be communicated to the other slave devices in the same communication to the master device or in a separate communication to the slave devices. It is further understood that the communication to the other slave devices may be sent over multiple communications. The other slave devices in the selection round may use this communication to eliminate potential available addresses from the list of available addresses received from master device in step 406 in order to avoid selecting a conflicting duplicate address.

In certain embodiments, a configured device that has been previously assigned an address may reset its address to the default reserved address if the slave device 102 determines that it has become unreliable. By resetting the address to the default reserved address, the slave device will be recognized instead as an unconfigured device rather than a configured device, this may trigger the master device to reinitiate configuration of the slave device 102. The slave device may be considered in an unreliable state if it no longer recognizes signals sent over network 101 or if memory 210 becomes corrupted. The slave device may also be restored to its original state and reconfigured if a user manual initiates reconfiguration by resetting the device address to the default reserved address.

In some embodiments, the master devices uses the selected address to send HVAC-related parameters to the slave device, and the slave device to which the HVAC-related parameters are addressed is further configured to use the HVAC-related parameters to perform an HVAC-related operation.

The method described with respect to FIG. 4A may have more or fewer steps, and the steps may be performed in any suitable order. As an example, steps 405-409 may be optional in certain embodiments (e.g., depending on whether the slave devices select an address at random).

Figure 4B:
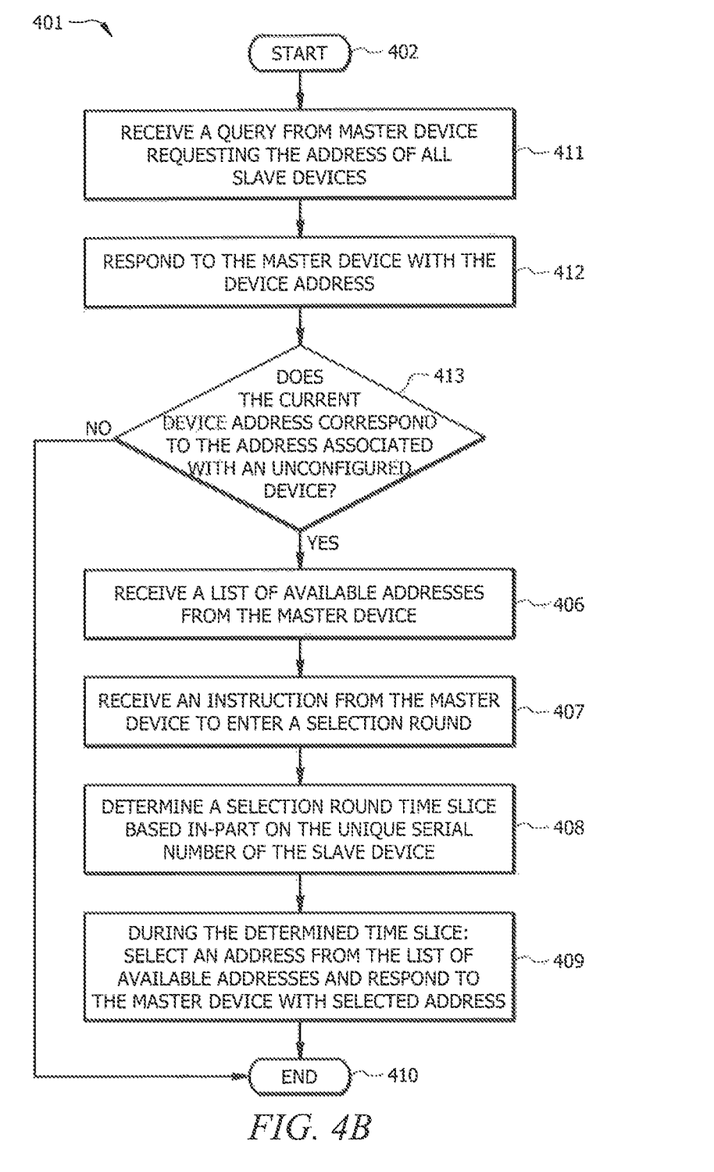

FIG. 4B illustrates another variation from the perspective of the slave device. It is understood that embodiments shown are simply used as examples and the invention is not restricted to these embodiments alone. FIG. 4B is a flowchart illustrating a method of operating example multi-refrigeration systems from the perspective of a slave device. In particular embodiments, slave device 102 performs method 401. In step 402, the device 102 operates as a slave device in communication with a master device and other slave devices 102 in system 100. The method 400 may be commenced in step 402 by either a signal received from the master device 102 or the method 400 may be initiated by the slave device 102 itself. The slave device itself may initiate method 400 by beginning with step 402 after determining that the slave device itself is assigned with the default reserved address. The default reserved address used to indicate that a device 102 is unconfigured may be any number, for example, the default reserved address may be the address number 247. In some embodiments, a slave device having address 247 may begin method 400 by initiating step 402.

In certain embodiments, in step 411 slave device 102 may receive a query from the master device requesting the address of all slave devices 102 on network 101. In some embodiments, the query may be a global query to all slave devices on network 101. In step 412 the slave device may respond to the master device in a communication which includes the current address of the device. In step 413, if the slave device 102 has an address which corresponds with the default reserved address for system 100, for example such as address 247, then the slave device 102 will proceed to step 406, otherwise if the slave device 102 has any address other than the default reserved address method 401 may be terminated and end with step 410. If, for example, a slave device 102 receives a query from the master device in step 411 and responds to the master device in step 412 with a device address which corresponds to the default reserved address indicating that the device is unconfigured, the master device will send out a command in steps 406 and 407 to configure the device, otherwise if no slave device responds with a communication having the reserved default address then the method 401 may be terminated.

In certain embodiments, steps 406 and 407 comprise a command sent from the master device and received by the slave device 102. In certain embodiments, the command comprises a list of available addresses and instructions received by the slave device 102 in step 406. In some embodiments, the command comprises instructions received by the slave device 102 in step 407, instructing the slave device to enter a selection round. It is understood that the command could be received from a single communication or the command may be multiple messages received through network 201. In certain embodiments, the instructions to select an address in step 407 may also include instructions to respond with the selected address.

In certain embodiments, the instructions may specify a time window in which to respond with the selected address. In certain embodiments, the instructions may also include instructions for the unconfigured slave device 102 to select a time slice within the time window in which to respond to the master device with the selected address from the list of available addresses. For example, the command may be received as a communication containing a list of available addresses and a second communication may be received containing instructions directing slave device 102 to select a time slice in a time window and to select an address from the list of available addresses, the instructions may further include instructions to respond to the master device with the selected address during the selected time slice. It is also understood that the command including the list of available addresses and instructions may be further divided and sent over any number of communications.

In certain embodiments, in step 408 and 409 the slave device 102 would carry out the command received from the master device in steps 406 and 407. Steps 408 and 409 may be carried out together or may be performed separately. In step 408, the slave device 102 may determine its time slice during the time window of the selection round. The time slice determined in step 408 by slave device 102 may be determined based on the instructions received from the master device in step 407. The instructions received in step 407 may include the duration of the time window or the start time and end time of the time window of the selection round.

The instructions received in step 407 may further instruct the slave device 102 on how to select a time slice and how long a time slice should be. In certain embodiments, the time slices within the time window may be discrete or they may be randomly selected from anytime within the time window. The length of a time slice may be based on factors such as the number of total devices 102 on a system 100, the number of unconfigured devices on the system, the number of devices concurrently instructed to enter a selection round, the length of the time window, and/or any other factors relevant to the selection round.

In certain embodiments, the length of the time slice may be calculated to minimize the potential for conflicting time slices which could result in communication interference if multiple devices simultaneously communicate their selected address over network 101. For example, for a system 100 having six total devices, four of which are unconfigured and commanded to enter the same selection round, the master device may instruct each of the slave devices commanded to enter the selection round to select a time slice with a length of one eighth of a second during a three second time window during the selection round. In certain embodiments, the processing circuitry 220 of device 102 may randomly select the time slice within the time window. The random selection may be accomplished by implementing a computation random number generator using processing circuitry 220 or a pseudorandom number generator. In some embodiments, the serial number associated with the device may be used as a seed value for the random number computation algorithm.

In certain embodiments, in step 409 the slave device will select an address from the list of available addresses provided by the master device in step 406 to be used as the slave device's address. For example, during the slave device's determined time slice the slave device may select the first available address from the list of available addresses and the subsequent slave devices may then sequentially select addresses from the list of available address during their respective determined time slices. The slave device 102 may store the selected device address in the device's own memory 210 using processing circuitry 220. The slave device may communicate the selected address to the master device by responding to the master device with the selected address, the master device may store the slave device's address in memory 210 to facilitate communication over network 101 with the slave device 102.

It is understood that in certain embodiments the slave device may instead select an address at random, rather than from the list of available addresses provided from the master device in step 406, the random address selection could be any address in the range of addresses included on network 101 except for any reserved addresses used to indicate an unconfigured device 102. In certain embodiments, the processing circuitry 220 of device 102 may randomly select the address from the list of available addresses. The random selection may be accomplished by implementing a computation random number generator using processing circuitry 220 or a pseudorandom number generator. In some embodiments, the serial number associated with the device may be used as a seed value for the random number computation algorithm.

In certain embodiments, the selected address is also sent to the other slave devices 102. This communication including the selection of the address may be communicated to the other slave devices in the same communication to the master device or in a separate communication to the slave devices. It is further understood that the communication to the other slave devices may be sent over multiple communications. The other slave devices in the selection round may use this communication to eliminate potential available addresses from the list of available addresses received from master device in stop 406 in order to avoid selecting a conflicting duplicate address.

In certain embodiments, a configured device that has been previously assigned an address may reset its address to the default reserved address if the slave device 102 determines that it has become unreliable. By resetting the address to the default reserved address, the slave device will be recognized instead as an unconfigured device rather than a configured device, this may trigger the master device to reinitiate configuration of the slave device 102. The slave device may be considered in an unreliable state if it no longer recognizes signals sent over network 101 or if memory 210 becomes corrupted. The slave device may also be restored to its original state and reconfigured if a user manual initiates reconfiguration by resetting the device address to the default reserved address.

The method described with respect to FIG. 4B may have more or fewer steps, and the steps may be performed in any suitable order. As an example, steps 405-409 may be optional in certain embodiments (e.g., depending on whether the slave devices select an address at random).

Modifications, additions, or omissions may be made to any of the methods disclosed herein. These methods may include more, fewer, or other steps, and steps may be performed in parallel or in any suitable order. Throughout the disclosure, the term HVAC is used in a general sense and refers to any system that circulates refrigerant in order to control the temperature of a space. Examples include heat pump systems, air conditioning systems, combined heating-and-air conditioning systems, and refrigeration systems. While discussed as certain components of the climate control system controller performing the steps, any suitable component or combination of components may perform one or more steps of these methods. Certain examples have been described using the modifiers "first" or "second" (e.g., first slave device, second slave device). Unless the context in which these modifiers appear indicates otherwise, the modifiers do not require any particular sequence of steps or arrangement of devices.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. A system, comprising:
a master device; and
a plurality of slave devices;
the master device configured to:
determine that two or more of the slave devices use a default address reserved for unconfigured devices; and
communicate a first command to each slave device that is using the default address, wherein the first command comprises a list of unused addresses, an instruction to enter a first selection round to select one of the addresses from the list, and a time window for the slave devices to perform the first selection round;
wherein each slave device that is using the default address is configured to, in response to receiving the first command communicated by the master device:
determine a time slice within the time window to select one of the addresses from the list of unused addresses, the time slice corresponding to a segment of a plurality of predetermined segments of the time window, wherein the predetermined segments of the time window do not overlap;
during the determined time slice for the slave device;
select one of the addresses from the list of unused addresses; and
communicate a message indicating the selected address to the master device and the other slave devices;
wherein the master device is further configured to:
detect an error corresponding to a first slave device and a second slave device of the plurality of slave devices determining the same time slice to use for selecting their respective addresses and communicating their selected addresses to the master device and the other slave devices; and
in response to detecting the error, communicate a second command to the first slave device and the second slave device, wherein the second command comprises a list of remaining unused addresses and an instruction to enter a second selection round to select one of the addresses from the list of remaining unused addresses.

2. The system of claim 1, each slave device further configured to:
receive a message indicating that another one of the slave devices has selected one of the addresses from the list of unused addresses; and
in response to receiving the message, remove that address from the list of unused addresses.

3. The system of claim 1, wherein each slave device is configured to determine the time slice using a serial number associated with that slave device as a seed value in a random number generator.

4. The system of claim 1, wherein the master device is further configured to:
determine that a third slave device and a fourth slave device of the plurality of slave devices selected the same address from the list of unused addresses; and
in response to determining that the third slave device and a fourth slave selected the same address, communicate a third command to the third slave device and the fourth slave device, wherein the third command comprises the list of remaining unused addresses and an instruction to enter a third selection round to select one of the addresses from the list of remaining unused addresses.

5. The system of claim 1, wherein the first slave device is further configured to:
select a first address from the list of unused addresses during the first selection round;
operate using the first address for a period of time;
detect that the first slave device no longer recognizes commands provided by the master device or that a memory of the first slave device is corrupted; and
in response to detecting that the first slave device no longer recognizes commands provided by the master device or that the memory of the first slave device is corrupted, reset the first address to the default address.

6. The system of claim 1, wherein each slave device that is using the default address is configured to randomly select one of the addresses from the list of unused addresses.

7. The system of claim 1, wherein the system comprises a heating ventilation and air conditioning (HVAC) system and the master and slave devices each comprise a heat exchanger and a controller, the controller communicatively coupled to the system via an interface using MODBUS protocol.

8. The system of claim 7, wherein:
the master device is further configured to communicate one or more HVAC-related parameters to one of the slave devices using the address selected by that slave device; and
the slave device to which the HVAC-related parameters are addressed is further configured to use the HVAC-related parameters to perform an HVAC-related operation.

9. A device configured to:
determine that two or more communicatively coupled other devices use a default address reserved for unconfigured devices;
communicate a first command to each other device that is using the default address, wherein the first command comprises a list of unused addresses, an instruction to enter a first selection round to select one of the addresses from the list, and a time window for the other devices to perform the first selection round, wherein the time window comprises a plurality of time slices, each time slice corresponding to a segment of a plurality of predetermined segments of the time window, wherein the predetermined segments of the time window do not overlap; and
receive, during the time window, a message, from each determined other device, indicating a corresponding selected address for the other device;
detect an error corresponding to a first other device and a second other device of the two or more other devices determining the same time slice to use for one or both of selecting their respective addresses and indicating their selected addresses to the device; and
communicate a second command to the first other device and the second other devices, wherein the second command comprises a list of remaining unused addresses and an instruction to enter a second selection round to select one of the addresses from the list of remaining unused addresses.

10. The device of claim 9, wherein the device is further configured to:
- determine that a third other device and a fourth other device selected the same address from the list of unused addresses; and
- communicate a third command to the third other device and the fourth other device, wherein the third command comprises the list of remaining unused addresses and an instruction to enter a third selection round to select one of the addresses from the list of remaining unused addresses.

11. The device of claim 9, wherein the device and the other devices each comprise a heat exchanger and controller, the controller communicatively coupled to a bus operable to interface using MODBUS protocol.

12. The device of claim 11, wherein the device is further configured to communicate one or more HVAC-related parameters to one of the other devices using the address selected by the other devices.

13. A device using a default address reserved for unconfigured devices, the device configured to:
- receive a first command, wherein the first command comprises a list of unused addresses, an instruction to enter a first selection round to select one of the addresses from the list, and a time window for the device to perform the first selection round;
- determine a time slice within the time window to select one of the addresses from the list of unused addresses, the time slice corresponding to a segment of a plurality of predetermined segments of the time window, wherein the predetermined segments of the time window do not overlap;
- remove an address from the list of unused addresses if a message is received indicating that another device has selected one of the addresses, thereby determining a list of remaining unused addresses;
- during the determined time slice for the device, select one of the addresses from the list of unused addresses and communicate a message indicating the selected address; and
- receive a second command associated with a determination that the device and another device determined the same time slice, wherein the second command comprises an instruction to enter a second selection round to select one of the addresses from the list of remaining unused addresses.

14. The device of claim 13, wherein the device is further configured to:
- select a first address from the list of unused addresses during the first selection round;
- operate using the first address for a period of time;
- detect that the device no longer recognizes received commands or that a memory of the device is corrupted; and
- in response to detecting that the device no longer recognizes received commands or that the memory of the device is corrupted, reset the first address to the default address.

15. The device of claim 13, wherein the device is further configured to receive a third command associated with a determination that the device and another device selected the same address, wherein the third command comprises the list of remaining unused addresses and an instruction to enter a third selection round to select one of the addresses from the list of remaining unused addresses.

16. The device of claim 13, wherein the device comprises a heat exchanger and a controller, the controller communicatively coupled to a bus operable to interface using MODBUS protocol.

17. The device of claim 16, wherein the device is further configured to:
- receive HVAC-related parameters addressed to the device; and
- use the HVAC-related parameters to perform an HVAC-related operation.

* * * * *